April 22, 1952

H. E. SMITH 2,594,085

RADIO APPARATUS

Filed Jan. 29, 1948

WITNESSES:
E. A. McCloskey.
Nw. Le Groome

INVENTOR
Homer E. Smith.
BY
F. E. Browder
ATTORNEY

Patented Apr. 22, 1952

2,594,085

UNITED STATES PATENT OFFICE 2,594,085

RADIO APPARATUS

Homer E. Smith, Northumberland, Pa., assignor to Westinghouse Electric Corporation, East Pittsburgh, Pa., a corporation of Pennsylvania Application January 29, 1948, Serial No. 5,045

7 Claims. (Cl. 116—124.2)

This invention relates to apparatus for tuning radio circuits of the type in which an adjustable element or rotor of a tuning device operates an indicating device to indicate the frequency to which the circuit is tuned, and it has for an object to provide improved apparatus of this kind.

A further object is to provide improved and simple apparatus wherein a tuning device is caused to operate an indicating device.

A still further object is to provide improved tuning and indicating apparatus wherein a tuning device is connected to an indicating device through a linkage system.

A still further object is to provide improved tuning and indicating apparatus wherein approximately 180 degrees rotation of the tuning device causes approximately 90 degrees rotation of the indicating device.

Still another object is to provide improved tuning and indicating apparatus that is economical to manufacture and easy to assemble.

These and other objects are affected by this invention, as will be apparent from the following description and claims, taken in connection with the accompanying drawings, forming a part of this application, in which:

Figure 1:
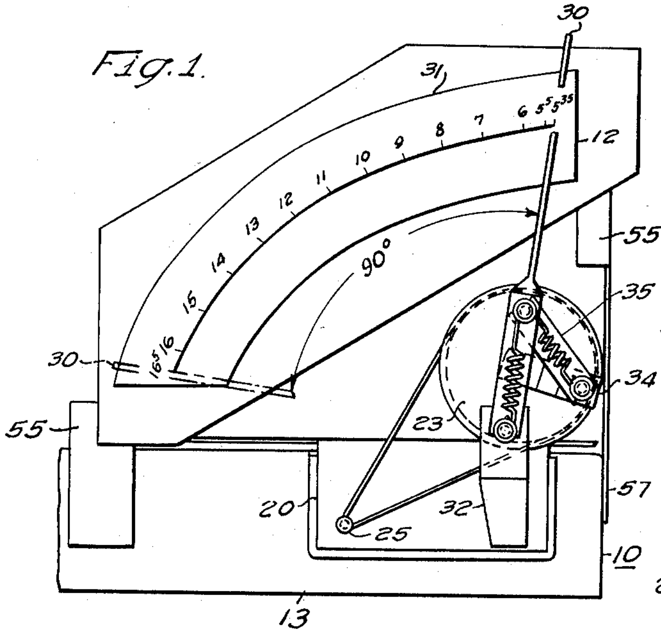
Fig. 1 is a front elevation of my apparatus and illustrates how it is incorporated into a radio receiver.
Figure 2:
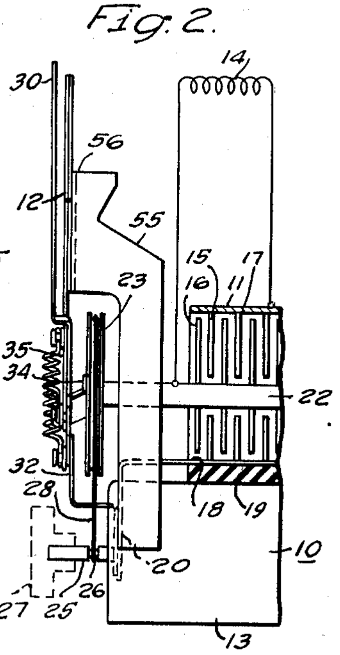
Fig. 2 is an end view of the apparatus shown in Fig. 1 as seen from the right of Fig. 1; and, Fig. 3 is a partial exploded view of my tuning and indicating apparatus.
Figure 3:
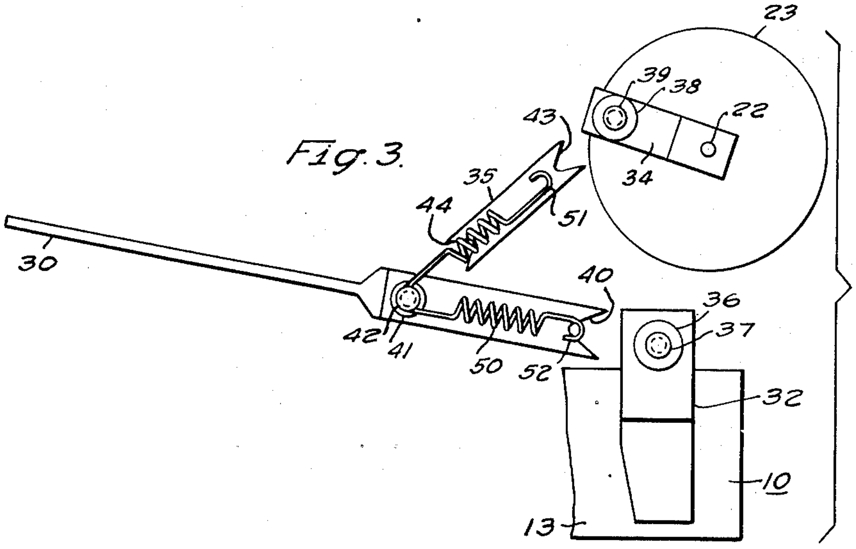

Referring to the drawing in detail, I show a radio receiver 10 having a tuning device 11 for tuning a circuit 14 to the desired frequency and an indicating device 12 as provided by my invention.

The receiver 10 includes a chassis 13 of the usual type found in radio receivers, and the necessary parts for making up the receiver, such as transformers, tubes, condensers, resistors, inductances, speakers, and the like, are mounted thereon.

The tuning device 11 is illustrated as a variable condenser, however, it is understood that a variable inductance could also be used without departing from the scope of my invention. The condenser 11 comprises fixed plates 15 and interleaving rotary plates 16. The fixed plates 15 are attached to a casing 17, which casing is mounted on the chassis 13 by means of a bracket 18. The bracket 18 is attached to the casing 17 in some suitable manner and it is also attached to the chassis 13 along the front thereof, as indicated at 20, by any suitable means. The entire condenser assembly 11 is shock mounted on the chassis 13 by a shock member 19 which is located between the bracket 18 and the top of the chassis 13. The rotary plates 16 are mounted on a shaft 22 which extends to the front of the chassis 13. A pulley 23 is mounted on the front end of the shaft 22. An idler shaft 25 is carried by the bracket 18 and is located at the front of the chassis 13. The shaft 25 is provided with a pulley 26 and a knob 27 for rotating the shaft. A belt or cord 28 extends over the pulleys 23 and 26. It is seen that as the knob 27 is rotated the rotary plates 16 of the condenser 11 are rotated through the medium of the pulleys 23, 26 and belt 28. This varies the capacity of the condenser 11 to tune the receiver circuit 14 to the desired frequency.

The indicating device 12 comprises a pointer 30 and a graduated scale 31.

The pointer 30 is connected to the shaft 22 in such manner that as the condenser plates 16 are rotated through approximately 180 degrees, the pointer 30 will be rotated through approximately 90 degrees. This reduction of angular movement is accomplished by a linkage arrangement which connects the pointer 30 to the shaft 22. This arrangement comprises a bracket 32, an eccentric or crank arm 34, and a link 35. The bracket 32 is attached to the bracket 18 and is located near the front of the chassis 13. A pivot pin 36 having a groove 37 therein is located near the top of the bracket 32. The crank arm 34 is attached to the shaft 22 in such manner as to rotate with the shaft. A pivot pin 38 having a groove 39 therein is located near the outer end of the crank arm 34. The pointer member 30 has a V-shaped notch 40 in the lower end thereof and a pivot pin 41, having a groove 42 therein, is located thereon some distance above the notch 40. The link member 35 has a V-shaped notch 43 at one end and a similar V-shaped notch 44 at the other end thereof. The V-shaped notch 40 fits into the groove 37 in the pivot pin 36, the V-shaped notch 43 on the link 35 fits into the groove 39 in the pin 38, and the V-shaped notch 44 on the link 35 fits into the groove 42 in the pivot pin 41. A coil spring 50 having a hook 51 on one end and a hook 52 on the other end maintains the linkage arrangement tightly assembled. This is accomplished by placing the hook 51 over the pivot pin 38, looping the middle of the spring 50 around the pivot pin 41 and placing the hook 52 over the pivot pin 36.

It is seen that as the crank arm 34 is rotated by turning the shaft 22, the link 35 pivots about the pin 38 and causes the pointer 30 to pivot about the pivot pin 36. Rotation of the crank arm 34 through approximately 180 degrees causes the pointer 30 to be rotated through approximately 90 degrees.

The scale 31 is arcuate in shape and is graduated from 535 kc. to 1650 kc. which is substantially the broadcast frequency band. These graduations extend substantially 90 degrees. The scale 31 is located behind and adjacent the pointer 30 so that the frequency to which the radio receiver is tuned at any instant may be easily determined by reading the position of the pointer 30 relative to the graduation on the scale 31.

The scale 31 is attached to the chassis 13 by a pair of brackets 55. The brackets are attached to the scale 31 and the chassis 13 in some suitable manner, as indicated at 56 and 57, respectively.

An advantage of my arrangement is that it requires no expensive cams or gears to cause the pointer to rotate with the tuning device. Another advantage is that my linkage arrangement is easy to assemble and requires no expensive tools to assemble. To assemble, the pointer 30 and the link 35 are merely placed in position relative to the pivot pins and the spring 50 is snapped over the pivot pins to maintain the parts in position.

From the foregoing description taken with the drawing, it is seen that I have provided an improved and economical tuning and indicating device for radio circuits which requires no cams, or gears and which may be easily assembled by unskilled labor without the use of expensive and complicated tools.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth by the appended claims.

I claim as my invention:

1. In combination, a rotor of a tuning device, a shaft for said rotor, an eccentric on said shaft, a pointer and scale for indicating the position of said rotor, a first pivot for said pointer, a second pivot on said pointer, and a single link pivoted to said eccentric at one end and connected to said second pivot to transmit rotary movement from said rotor to said pointer to cause said pointer to rotate about said first pivot.

2. In combination, a rotor of a tuning device, a shaft for said rotor, means for rotating said shaft, an eccentric on said shaft, a pointer and scale for indicating the position of said rotor, a first pivot for said pointer, a second pivot on said pointer, and means comprising a single link pivotally connected between said eccentric and said second pivot to cause said pointer to rotate about said first pivot and effect a reduction in angular movement from said rotor to said pointer.

3. In combination, a rotor of a tuning device, a shaft for said rotor, means for rotating said shaft, an eccentric on said shaft, a pivot on said eccentric, a pointer and scale for indicating the position of said rotor, a first pivot for said pointer, a second pivot on said pointer, and a single link pivotally connected between the pivot on said eccentric and the second pivot on said pointer for transmitting rotary motion from said rotor to said pointer to cause said pointer to rotate about said second pivot.

4. In combination, a rotor of a tuning device, a shaft for said rotor, means for rotating said shaft, an eccentric on said shaft, a pivot on said eccentric, a pointer and scale for indicating the position of said rotor, a first pivot for said pointer, a second pivot on said pointer, a single link pivotally connected between the pivot on said eccentric and the second pivot on said pointer for transmitting rotary motion from said rotor to said pointer to cause said pointer to rotate about said second pivot, and a spring engaging the pivot on said eccentric and said two pivots for said pointer for retaining said pointer and said link in assembled relationship.

5. In radio apparatus, a chassis, a rotor of a tuning device mounted on said chassis, a shaft for said tuning device, means for rotating said shaft, an eccentric on said shaft, a pivot on said eccentric, a pointer and scale for indicating the position of said rotor, a first pivot for said pointer located on said chassis, said pointer having a notch therein for engaging said first pivot, a second pivot on said pointer, and a link having a first notch therein for engaging the pivot on said eccentric and a second notch therein for engaging said second pointer pivot.

6. In radio apparatus, a chassis, a rotor of a tuning device mounted on said chassis, a shaft for said tuning device, means for rotating said shaft, an eccentric on said shaft, a pivot on said eccentric, a pointer and scale for indicating the position of said rotor, a first pivot for said pointer located on said chassis, said pointer having a notch therein for engaging said first pivot, a second pivot on said pointer, and a link having a first notch therein for engaging the pivot on said eccentric and a second notch therein for engaging said second pointer pivot and a spring engaging the pivot on said eccentric and said first and second pointer pivots for retaining said pointer and said link in assembled relationship.

7. In combination, a rotor of a tuning device, a shaft for said rotor, means for indicating the position of said rotor comprising a scale and a pointer movable along said scale, a member having one end pivoted eccentrically to said shaft and its other end pivoted to said pointer immediate the ends thereof in such manner that approximately 180° rotation of said rotor effects approximately 80° rotary movement only of said pointer along said scale.

HOMER E. SMITH.

REFERENCES CITED

The following references are of record in the file of this patent:

UNITED STATES PATENTS

| Number | Name | Date |
|---|---|---|
| 1,810,355 | Kingsford et al. | June 16, 1931 |
| 1,919,043 | Roth | July 18, 1933 |
| 2,252,295 | Plensler | Aug. 12, 1941 |
| 2,273,946 | Fichter | Feb. 24, 1942 |
| 2,281,093 | Benton et al. | Apr. 28, 1942 |